(12) United States Patent
Alderman

(10) Patent No.: US 7,704,584 B2
(45) Date of Patent: Apr. 27, 2010

(54) THERMAL INSULATION WITH THIN PHASE CHANGE LAYER

(76) Inventor: Robert J. Alderman, 218 Anglers Dr., S., Marathon, FL (US) 33050

( * ) Notice: Subject to any disclaimer, the term of this patent is extended or adjusted under 35 U.S.C. 154(b) by 0 days.

(21) Appl. No.: 12/135,404

(22) Filed: Jun. 9, 2008

(65) Prior Publication Data

US 2008/0312359 A1    Dec. 18, 2008

Related U.S. Application Data

(60) Provisional application No. 60/943,592, filed on Jun. 13, 2007.

(51) Int. Cl.
*B32B 1/00* (2006.01)
*B32B 1/04* (2006.01)
*B32B 1/06* (2006.01)
*B32B 3/00* (2006.01)
*C09K 5/00* (2006.01)
*C09K 5/02* (2006.01)
*C09K 5/06* (2006.01)

(52) U.S. Cl. ............... 428/72; 165/104.19; 165/104.21; 428/68; 428/76

(58) Field of Classification Search ............ 428/68, 428/72, 76; 165/104.19, 104.21
See application file for complete search history.

(56) References Cited

U.S. PATENT DOCUMENTS

| | | | |
|---|---|---|---|
| 3,986,969 A | 10/1976 | Telkes | 252/70 |
| 4,010,620 A | 3/1977 | Telkes | 62/2 |
| 4,011,190 A | 3/1977 | Telkes | 260/33.65 |
| 4,034,736 A | 7/1977 | Telkes | 126/270 |
| 4,187,189 A | 2/1980 | Telkes | 252/70 |
| 4,250,866 A | 2/1981 | Telkes | 126/116 |
| 4,954,278 A | 9/1990 | MacCracken et al. | 252/70 |
| 5,626,936 A | 5/1997 | Alderman | 428/68 |
| 5,770,295 A | 6/1998 | Alderman | 428/68 |
| 6,482,332 B1 * | 11/2002 | Malach | 252/70 |
| 2005/0281979 A1* | 12/2005 | Toas et al. | 428/113 |
| 2006/0188672 A1* | 8/2006 | Brower | 428/34.1 |

FOREIGN PATENT DOCUMENTS

| WO | WO 9100324 A1 * | 1/1991 |
|---|---|---|
| WO | WO 9727264 A1 * | 7/1997 |

* cited by examiner

*Primary Examiner*—Brent T O'Hern
(74) *Attorney, Agent, or Firm*—Thomas, Kayden, Horstemeyer & Risley, LLP

(57) ABSTRACT

The present disclosure encompasses provides thermal stabilizer compositions comprising a phase change material admixed with a support material such as a diatomaceous earth, and a nucleator. The present disclosure further encompasses a heat insulation blanket for reducing heat transfer between adjacent spaces, comprising at least two plies of thermoplastic sheet material in superposed relationship and a seal, wherein the seal connects the plies of sheet material to form a cell containing a volume of a thermal stabilizer comprising a phase change material, a support material such as a diatomaceous earth, and a nucleator.

5 Claims, 2 Drawing Sheets

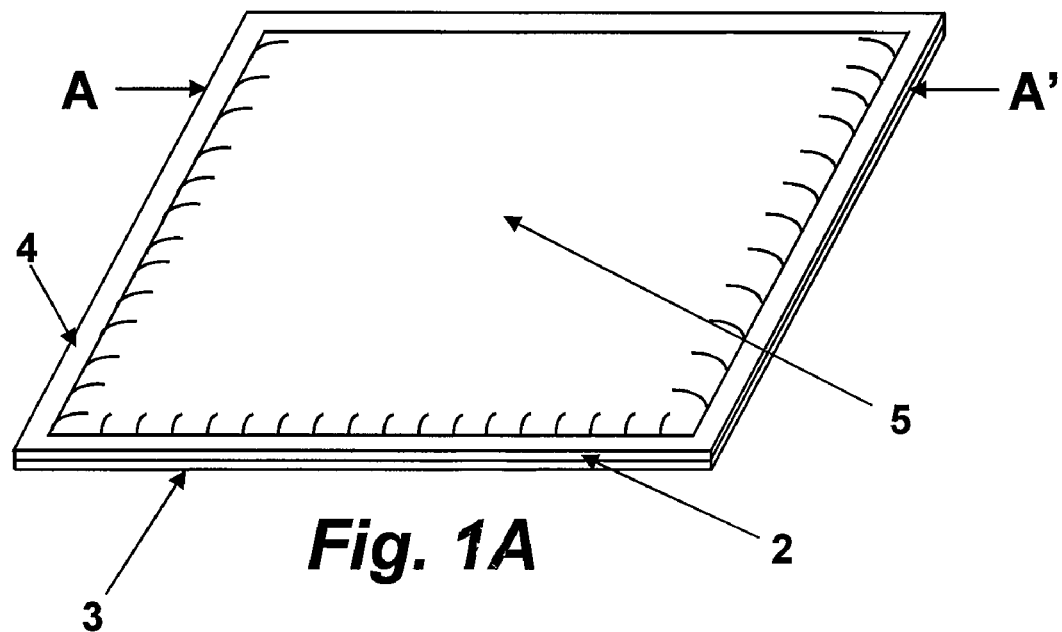
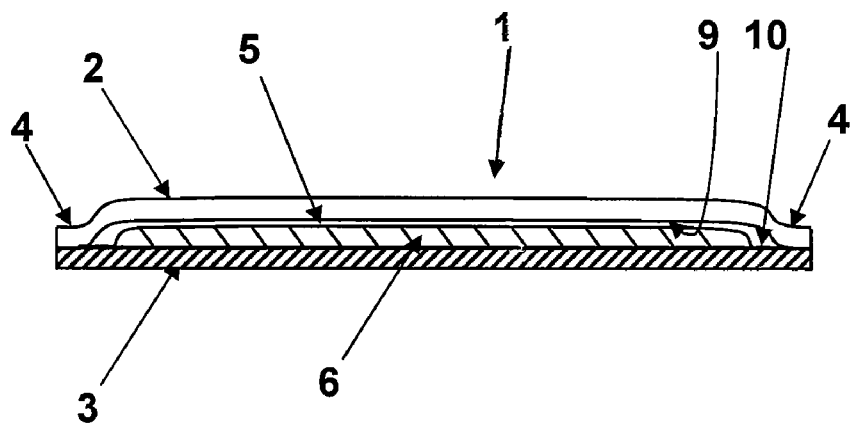

THERMAL INSULATION WITH THIN PHASE CHANGE LAYER

CROSS-REFERENCE TO RELATED APPLICATION

This application claims priority to U.S. provisional application entitled "THERMAL INSULATION WITH THIN PHASE CHANGE LAYER" having Ser. No. 60/943,592 filed on Jun. 13, 2007, which is entirely incorporated herein by reference.

FIELD OF THE DISCLOSURE

The disclosure relates to a phase change compositions and to thermal insulation structures for placement between a relatively constant temperature space and a variable temperature space.

BACKGROUND

Building structures constructed for human occupancy typically maintain the temperature and humidity conditions inside the building at a comfortable level for its occupants with the use of heating and air conditioning equipment controlled by a thermostat, whereas the temperature outside the building varies with atmospheric conditions. The roof and/or exterior walls of a modern building usually include at least one layer of thermal insulation material to retard the transfer of heat between the inside and outside surfaces of the structure. If the amount of insulation material is sufficient, the transfer of heat during the day from the hot outside portion of the wall or ceiling to the lower inside temperature portion of the structure will be reduced. The air conditioning unit of the building can then compensate for any undesirable increase in temperature. Later, the exterior portion of the wall and ceiling might cool to a temperature that is lower than the inside temperature of the building. In a like manner, the heating unit of a sufficiently insulated building structure compensates for any undesirable decrease in the internal temperature of the building structure.

The rate of heat will flow through a wall or ceiling into or out of a room is dependent upon at least two factors: the temperature gradient between the inside and the outside of the structure, and the efficiency with which the ceiling or wall conducts heat. To reduce the rate of heat transfer across the ceiling or wall into or out of the building structure, a greater quantity of and/or a more efficient insulating material can be used. Such insulating materials include, for example, fiberglass, mineral wood, urethane foams, cellulose, and other materials known in the art.

Though conventional insulating materials can be effective at reducing heat transfer through the walls or ceilings, etc., conventional insulation materials are expensive, bulky, difficult to install, and in some instances are not very effective for specific commercial and private applications. Also, some structures are not built with enough space to accommodate the quantity of insulation materials necessary to adequately insulate the structure.

Heat applied to a phase change material ("PCM") in a solid state is absorbed by the PCM, resulting in an increase in the temperature of the PCM. As the temperature of the PCM reaches its phase change temperature, i.e., the temperature at which the PCM material changes from a solid state to a liquid state, the PCM stops increasing in temperature and substantially maintains a constant temperature at its phase change temperature, consuming the heat being applied thereto and storing it as latent heat. Latent heat is the heat gained by a substance without any accompanying rise in temperature during a change of state. In essence, it is the amount of heat necessary to change a substance from the solid state to the liquid state. Once the phase change material has completely changed to a liquid state, the temperature of the PCM begins to rise again as the applied heat is now absorbed as sensible heat. In reverse, as the PCM drops in temperature, the latent heat is released at the phase change temperature of the PCM as the PCM changes into its solid state. Examples of PCM's for isothermally storing and releasing heat as described above are paraffin, calcium chloride hexahydrate, sodium carbonate, and Glauber's salt. PCM's have been used in wall structures as described in U.S. Pat. Nos. 5,626,936 and 5,770,295.

A practical issue when using PCM's for isothermally storing and releasing heat in a large structure such as a vertical wall is maintaining the material in a uniform state over a large area. It is desirable that the phase changes occur evenly throughout the PCM, and that there be minimal localized changes that can result in unequal heat distribution. For example, when a PCM liquefies, there is a natural tendency for the liquid to descend under gravity and gather towards the bottom of a vertical wall, or to become absorbed into an adjacent material. Calcium chloride hexahydrate-based PCM, for example, can be made into a super-saturated solution, but when such a PCM mixture goes through the phase change from a solid to a liquid, it will pass through several hydration levels each having a different specific gravity. The liquid mix, as it melts, tends to stratify, with the heavier phases tending to move to the lowest level possible, thereby forming a gradient of layers. A PCM, therefore, should be confined to its intended location and remain in situ, ready for the next (reverse) phase change.

Certain PCM's, when exposed to the atmosphere will either evaporate and dry out or absorb excessive moisture, either event inhibiting or preventing the PCM from functioning as intended to moderate temperature. In particular, PCMs comprising solutions of calcium chloride, if not contained, may be corrosive to metals. Being highly hygroscopic, or deliquescent, if exposed to the atmosphere such PCMs will continue to absorb moisture to the point that that they become dilute aqueous solutions that have lost the desired phase change properties. It is also the case that PCMs may become supercooled and fail to solidify as a result of the lack of nucleation centers.

For these reasons, while the latent heat absorption and release capabilities of certain PCM's have been known and used in limited ways, wide spread practical and commercial use has been hampered.

Confinement or enclosure of the PCM, particularly liquid PCMs such as calcium chloride solutions, is possible in arrays of cells that can be formed between superposed layers of thermoplastic sheets, as taught by U.S. Pat. No. 5,626,936. However, by itself this mechanical means of confining the PCM into multiple small volumes reduces, but does not eliminate the problems of uneven melting and freezing or of leakage of the PCM.

What are needed, therefore, are thermal stabilization compositions that undergo efficient and uniform reversible phase changes. Such compositions should not exhibit phase separation due to stratification or settling, and provide uniform heat transfer over the area of a structure in which the composition in its packaged form is installed.

SUMMARY

A practical issue when using PCM's for isothermally storing and releasing heat in a large structure such as a vertical wall is maintaining the material in a uniform state over a large area. In particular, it is necessary that the phase change occur evenly throughout the PCM, and that there be minimal localized changes that result in unequal heat distribution. For example, when the PCM liquefies, there is a natural tendency for the liquid to move under gravity and gather towards the bottom of a vertical wall, or to become absorbed into an adjacent material. A PCM, therefore, should be confined to its intended location and remain in situ, ready for the next phase change.

One aspect of the present disclosure, therefore, provides thermal stabilization compositions comprising a phase change material admixed with a support material, and a nucleator. In the embodiments of this aspect of the disclosure, the phase change material may be selected from the group consisting essentially of: calcium chloride hexahydrate, sodium sulfate, paraffin, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chloride hexahydrate, potassium chloride and calcium chloride, or a mixture thereof. One advantageous embodiment of the disclosure is a phase change material comprising a mixture of strontium chloride hexahydrate, potassium chloride and calcium chloride. In other embodiments, the phase change material may comprise a supersaturated solution of calcium chloride hexahydrate.

The support material may comprise an inert adsorbent material. Particularly advantageous for use in the compositions of the disclosure is a diatomaceous earth, although other inert materials such as fly ash or permalite may also be considered for use in the compositions.

Another aspect of the present disclosure encompasses a heat insulation blanket for reducing heat transfer between adjacent spaces, comprising: at least two plies of thermoplastic sheet material in superposed relationship and having opposing inner surfaces, and a seal connecting the plies of sheet material, and wherein the seal and the opposing inner surfaces of the superposed plies define a cell, the cell containing a volume of a phase change material admixed with a support material, and a nucleator.

In embodiments of this aspect of the disclosure, the heat insulation blanket may further comprise a plurality of seals, wherein the plurality of seals and the opposing inner surfaces of the superposed plies define a plurality of cells containing amounts of a phase change material admixed with a support material. In one embodiment of the disclosure, the plurality of seals may comprise longitudinal seals and lateral seals thereby defining a lattice connecting the superposed plies.

In embodiments of this aspect of the disclosure, the phase change material may be selected from the group consisting essentially of: calcium chloride hexahydrate, sodium sulfate, paraffin, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chlorides hexahydrate, potassium chloride and calcium chloride, or a mixture thereof.

In embodiments of this aspect of the disclosure, the support material may comprise an inert adsorbent material such as, but not limited to, a diatomaceous earth.

In the various embodiments of this aspect of the disclosure, the phase change material may comprise a supersaturated solution of calcium chloride hexahydrate admixed with a support material, wherein the support material may comprise a diatomaceous earth admixed with calcium chloride dihydrate.

In one embodiment, the phase change material may advantageously comprise a mixture of strontium chloride hexahydrate, potassium chloride and calcium chloride admixed with a support material, and wherein the support material may comprise a diatomaceous earth admixed with calcium chloride dihydrate.

BRIEF DESCRIPTION OF THE FIGURES

FIG. 1A illustrates an insulating blanket comprising a single cell for containing a phase change material absorbed into a diatomaceous earth solid phase. A-A' indicates the plane of the cross-section shown in FIG. 1B.

FIG. 1B illustrates a cross-sectional view through the plane A-A' of an insulating blanket shown in FIG. 1A and comprising a single cell containing an amount of a phase change material absorbed into a diatomaceous earth solid phase.

DESCRIPTION OF THE DISCLOSURE

Figure 2A:
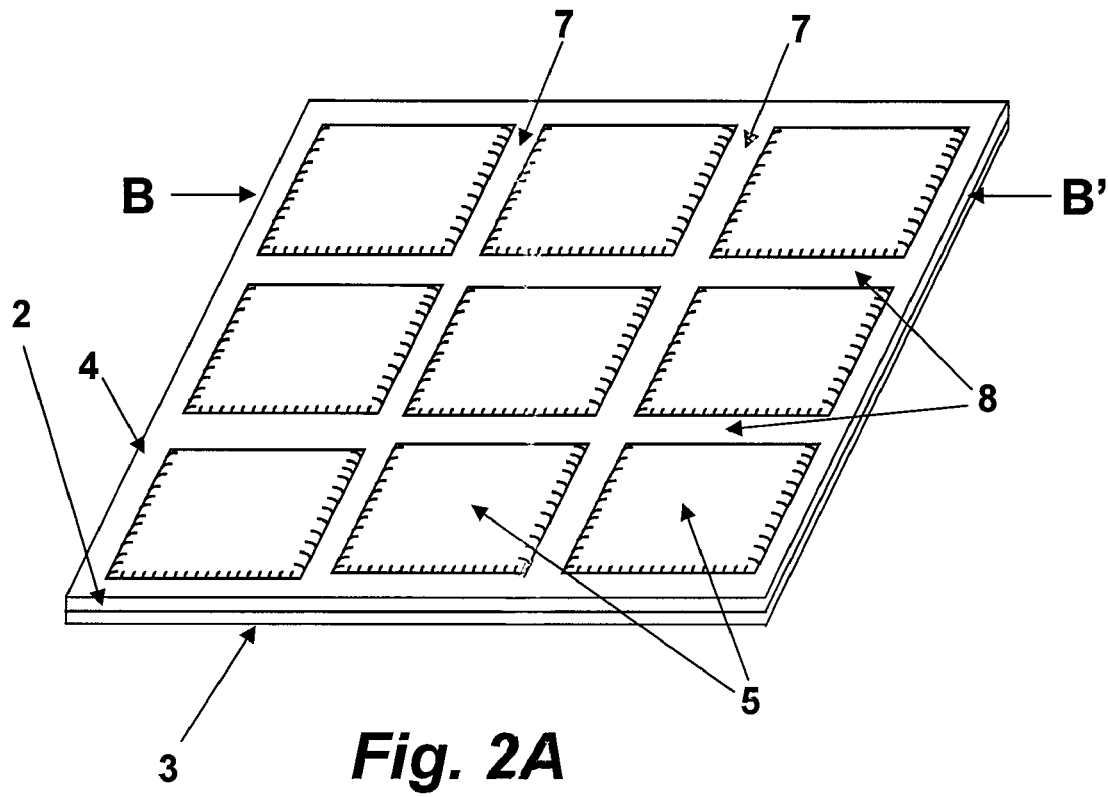
FIG. 2A illustrates an insulating blanket comprising a plurality of cells for containing a volume of a phase change material absorbed into a diatomaceous earth solid phase. B-B' indicates the plane of the cross-section shown in FIG. 2B.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C./room temperature and 1 atmosphere.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and the term is open-ended, allowing for the presence of more than that which is recited so long as basic or novel characteristics of that which is recited is not changed by the presence of more than that which is recited, but excludes prior art embodiments.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

A practical issue when using PCM's for isothermally storing and releasing heat in a large structure such as a vertical wall is maintaining the material in a uniform state over a large area. In particular, it is desirable that the phase changes occur evenly throughout the PCM, and that there be minimal localized changes that can result in unequal heat distribution. For example, when a PCM liquefies, there is a natural tendency for the liquid to descend under gravity and gather towards the bottom of a vertical wall, or to become absorbed into an adjacent material. A PCM, therefore, should be confined to its intended location and remain in situ, ready for the next (reverse) phase change.

Besides displacement due to liquification, some PCMs suffer other disadvantages that result in uneven thermal transfer or a total loss of thermal stabilization. For example, a useful phase change material is a super-saturated solution of calcium chloride hexahydrate or compositions containing same. However, a volume of this material, when transitioning from a solid phase to a liquid phase, will pass through several hydration levels each of which has a different specific gravity. The liquid mix as it melts, therefore, tends to stratify, with the heavier phases tending to move to the lowest level possible, ultimately forming a gradient of layers. This stratified composition, upon phase reversal, will not revert to a homogeneous composition and uneven thermal release or adsorption is the result.

Phase change materials such as a saturated calcium chloride solution also suffer from the significant disadvantage that they may become supercooled as a result of a drop in the ambient temperature. In such an event, the temperature of the solution may fall below that point where solidification or crystallization takes place, but the phase change does not occur, and the material remains in a liquid state. Thermal stabilization will either not be efficient or will not take place at all.

Some PCM's, particularly those comprising calcium chloride, when exposed to the atmosphere will either evaporate and dry out or absorb excessive moisture, either event inhibiting or preventing the PCM from functioning as intended to moderate temperature. PCMs comprising solutions of calcium chloride, if not contained, may be corrosive to metals. Being highly hygroscopic, or deliquescent, if exposed to the atmosphere such PCMs will continue to absorb moisture to the point that that they may become dilute aqueous solutions that have lost the desired phase change properties. For these reasons, therefore, while the latent heat absorption and release capabilities of certain PCM's have been known and used in limited ways, wide spread practical and commercial use has been restricted.

The present disclosure encompasses thermal stabilization compositions suitable for use in regulating the interior temperatures of structures such as residential buildings, sheds, hangers, factory buildings and the like, the compositions comprising a thermal stabilizing phase change material (PCM) admixed with an inert solid absorbent support material and a nucleator. The term "nucleator" as used herein refers to a particle able to initiate the solidification of a supercooled substance by providing a solid focus upon which the solidification builds. The nucleator may be, but is not limited to, particles of the same substance that comprises the supercooled liquid, such as finely milled particles of calcium chloride dihydrate suspended in a supercooled saturated calcium chloride solution, the finely milled particles of the solid support material of the thermal stabilization compositions of the present disclosure, and the like.

The solid or semi-solid mixture thereby formed has advantageous properties when compared to the PCM alone. For example, by admixing the PCM with a solid support material to provide a solid or highly viscous formulation, the thermal stabilization composition will remain substantially uniform during phase changes, thereby providing even heat exchange over the entire area in contact with an insulator containing the thermal stabilizer. Absorption to an inert material such as a diatomaceous earth does not significantly interfere with the phase change properties of the PCM, but provides a solid or semi-solid composition that evenly changes phases and remains confined, thereby avoiding many of the disadvantages associated with current PCMs alone. For example, the liquid phase of the PCM may remain within the support material, and would not be free to leak into surrounding environs. The inclusion of a nucleator in the thermal stabilizing compositions of the present disclosure advantageously avoids the potential problem of supercooling during a drop in ambient temperature.

It is contemplated that the phase change materials of the disclosure may be any material that can undergo a phase change at temperatures typically encountered in the walls or ceiling spaces of a building, for example about 80° F. Phase change materials suitable for use in the compositions of the disclosure may include, but are not limited to, calcium chloride hexahydrate, sodium sulfate, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chloride hexahydrate, potassium chloride and calcium chloride, or a mixture thereof. A composition particularly useful in the compositions disclosed herein is a mixture of strontium chloride hexahydrate, potassium chloride and calcium chloride. An especially advantageous phase change mixture may comprise about 200 parts by weight water, about 10 parts by weight strontium chloride hexahydrate, 10 parts by weight potassium chloride and 200 parts by weight anhydrous calcium chloride. More advantageously, a phase change mixture may comprise about 198 parts by weight water, about 8 parts by weight strontium chloride hexahydrate, 8 parts by weight potassium chloride and 198 parts by weight anhydrous calcium chloride The phase change material useful in the compositions of the present disclosure may be admixed with an inert support material capable of absorbing the PCM, to form a solid or semi-solid thermal stabilizer composition. Depending on the ratio of the PCM to the support material, the admixed composition may have any consistency including, but not limited to, a near-liquid suspension of the support in the PCM, a slurry, a paste having a range of viscosities depending on the ratio of the solid support material to the liquid PCM, or a more solid composition that may be granular, powder-like or a near-solid. Most advantageous to the compositions of the present disclosure is that the amount of the solid support be sufficient that the final thermal stabilization compositions maintain their homogeneity during and after a phase change, i.e., that upon a phase change, for example, to a liquid state, there is no stratification, layering, settling or separation of the components of the compositions that would interfere with or preclude an even phase change reversal.

It is also contemplated that any solid insoluble support material may be combined with the PCMs of the disclosure, wherein the solid support may absorb some or all of a liquid PCM. Preferably, the support material may have a porous structure to receive the liquefied phase change material. However, the support material preferably impedes escape of a liquid phase PCM on warming of the insulating material. On cooling, the phase change composition is restored to its original state, and does not partition as two separate phases, namely the PCM and the solid support material.

Absorbent support materials suitable for use in the present disclosure may be, but are not limited to, diatomaceous earth, fly ash, perlite, cellulose (pellets, granules, powderous or fibrous), synthetic materials such a plastics, ceramics, minerals and the like. Advantageous support materials may have a profusion of cavities, hollow tubes and the like that may both increase their effective surface area and allow the PCM of choice to be absorbed into as well as onto the support particles. A particularly advantageous material is diatomaceous earth which has a high liquid absorbance capacity, is chemically inert being predominantly silica, and will form solids or semi-solids (pastes) when admixed with liquid compositions such as a liquid phase change material.

Diatomaceous earths, alternatively known as kieselguhr, celite or diatomite, are the fossilized deposits of microscopic siliceous skeletons of prehistoric algae. Most deposits, and especially those having properties advantageous for use in the thermal stabilizer compositions of the present disclosure, originate from marine diatomaceous algae and have a high percentage of tubular-like structures that provide a high liquid absorption and retention capacity, such that the material is an efficient filter. Diatomaceous earth offers the additional benefit as a component of a constructional insulating material of being fire-resistant. A typical chemical composition of diatomaceous earth is about 86% silica, about 5% sodium, about 3% magnesium and about 2% iron. Diatomaceous earth can readily absorb a liquid PCM to form a solid or semi-solid mix. By combining the PCM and the solid support (such as diatomaceous earth), the PCM compositions of the present disclosure allow a more uniform phase change throughout a volume of the PCM, and reduce localized or partial phase changes that can result in uneven temperature transmission across a PCM layer installed as thermal insulation.

Fly ash is one of the residues generated in the combustion of coal. Fly ash is generally captured from the chimneys of power generation facilities, whereas bottom ash is, as the name suggests, removed from the bottom of the furnace. Fly ash material solidifies while suspended in the exhaust gases and is collected by electrostatic precipitators or filter bags. Since the particles solidify while suspended in the exhaust gases, fly ash particles are generally spherical in shape and range in size from 0.5 µm to 100 µm. They consist mostly of silicon dioxide ($SiO_2$), which is present in two forms: amorphous, which is rounded and smooth, and crystalline, which is sharp, pointed and hazardous; aluminum oxide ($Al_2O_3$) and iron oxide ($Fe_2O_3$). Fly ashes are generally highly heterogeneous, consisting of a mixture of glassy particles with various identifiable crystalline phases such as quartz, mullite, and various iron oxides.

Perlite is an amorphous volcanic glass that has a relatively high water content, typically formed by the hydration of obsidian. It occurs naturally and has the unusual property of greatly expanding when heated sufficiently. When it reaches temperatures of 850-900° C., perlite softens (since it is a glass). Water trapped in the structure of the material vaporizes and escapes and this causes the expansion of the material to 7-16 times its original volume.

The thermal stabilizing compositions of the present disclosure also comprise a nucleator to reduce or prevent supercooling and non-solidification of the PCM after a drop in ambient temperature. It is contemplated that the nucleator may also be the solid support material itself, wherein the material may have points or sharp edges that can provide the nuclei that may trigger and support crystallization or solidification of the PCM. Alternatively, the nucleator material is not the support material but is an additional solid material that can be, for example, the same as the PCM but in solid form and will not enter a liquid phase regardless of the temperature of the composition.

In those embodiments of the disclosure wherein the phase change material is a supersaturated solution of calcium chloride, it is advantageous to deposit fine anhydrous calcium chloride directly onto the solid support material. Fine "extra" calcium chloride dihydrate particles deposited within and on the diatomaceous earth may provide nucleation foci and therefore reduce the possibility of the liquid phase change material super-cooling and no phase change occurring. In addition, in the event that extraneous water enters into the PCM of the insulation, the supersaturated composition can be maintained by dissolving of solid calcium chloride from the diatomaceous earth.

In embodiments of the present disclosure, solid support material may first be admixed with the nucleator. It is contemplated, for example, that anhydrous calcium chloride may be milled with diatomaceous earth to provide a fine powder wherein the diatomaceous earth and the calcium chloride are evenly distributed throughout, including within the tubular diatom structures themselves. An alternative approach is for the diatomaceous earth to be mixed with, and therefore to absorb, a solution of calcium chloride. The combination may then be heated to dryness, whereby the calcium chloride is intimately admixed with, i.e., deposited within and on the surface of, the tubular siliceous structures that comprises the diatomaceous earth.

When a liquid PCM such as a supersaturated solution of calcium chloride is added to the dry diatomaceous earth mix that has been pretreated to include dry calcium chloride, the dry, fine particles of "extra" calcium chloride will remain unhydrated because the liquid PCM is saturated. The 'extra' calcium chloride dihydrate particles remain in place, trapped by the filter action of the diatomaceous earth, to act as nucleators. In the absence of the diatomaceous earth filter material, ultrafine particles of calcium chloride would eventually settle under gravity descend to the lowest level of the volume of saturated solution in which they are suspended, and thereby become less effective as nucleators. The addition of the absorbent diatomaceous earth maintains an even distribution of the nucleation foci, and maintenance of PCM effectiveness over multiple heating-cooling cycles.

One example of the compositions of the present disclosure may be prepared by first preparing a diatomaceous earth dry-mix by admixing about 16 parts by weight of diatomaceous earth with about 5 parts by weight of dry calcium chloride dihydrate that has been milled to a fine powder. The final ratio would be about 16:5.

A PCM mixture may also be prepared, wherein, for example, about 195 parts by weight of water, about 8 parts by weight of strontium chloride hexahydrate, about 8 parts by weight of potassium chloride, and about 198 parts by weight anhydrous calcium chloride are combined. Finally the diatomaceous earth dry-mix and the PCM liquid mix may be admixed in a ratio of about 25 parts by weight diatomaceous earth dry-mix to about 50 parts by weight PCM liquid-mix. It is contemplated, however, that the proportions of the solid support mix and the PCM mix may be varied according to the needs of the application. Thus, for ease of insertion into a wall or ceiling, for example, a more moist final thermal stabilizing mix may be required to permit the material to be applied in all corners or to circumvent obstructions. Alternatively, a drier product may be desirable. In addition, the composition of the PCM may be adjusted to accommodate higher or power temperatures in the structure in which the composition is installed.

The present disclosure further encompasses thermal insulating products that incorporate the phase change compositions as presently disclosed. Such products are suitable for application in the thermal insulation of a building. In particular, it is contemplated that phase change compositions combining a phase change material, a solid support material and a nucleator according to the present disclosure, may be incorporated into thermal insulation blankets and sheets. Thermal insulating blankets or sheets suitable for incorporating the phase change compositions are described, for example, in U.S. Pat. Nos. 5,626,936 and 6,645,598 incorporated herein by reference in their entirety FIGS. 1A-2B illustrates two examples of embodiments of thermal insulating blankets or sheets according to the present disclosure. FIGS. 1A and 1B illustrate an embodiment wherein the blanket or sheet 1 comprises two superposed thermoplastic sheets, or plies, 2, 3 having opposing inner surfaces 9, 10 and joined by a encircling heat or adhesive-formed seam 4. In one embodiment of the blanket or sheet, as illustrated in FIGS. 1A and 1B, the seam 4 is disposed to define a single cell 5 encompassing the area of the thermoplastic plies 2, 3 except for the seam 4 themselves. The cell 5 contains an amount of the PCM-solid support 6 composition of the disclosure.

Figure 2B:
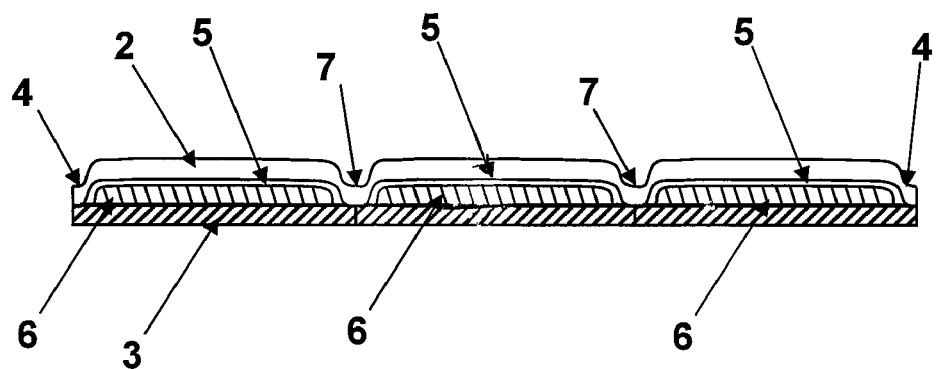
FIG. 2B illustrates a cross-sectional view through the plane B-B' of an insulating blanket shown in FIG. 2A and comprising a plurality of cells, each cell containing amounts of a phase change material absorbed into a diatomaceous earth solid phase.

In another advantageous embodiment of the present disclosure, as illustrated in FIGS. 2A and 2B, the thermal insulation blanket or sheet 1 comprises a plurality of cells 5 formed by a plurality of longitudinal 7 and lateral 8 seams 4 as described in U.S. Pat. Nos. 5,626,936 and 6,645,598, incorporated herein by reference in their entirety. In this embodiment, most or all of the cells may enclose a volume of the PCM-solid support 6 composition of the disclosure.

The thermal stabilizer compositions of the present disclosure may be introduced into the single large cell 5, or in a series of cells 5 during the seam fusion stage of the blanket manufacturing process or by injection into the sealed cells. Embodiments of the thermal blankets suitable for use with the compositions of the present disclosure and their methods of manufacture are fully described in U.S. Pat. Nos. 5,626,936 and 6,645,598 incorporated herein by reference in their entirety.

Leakage prevention may of concern when a PCM liquefies. In particular, supersaturated solution of calcium chloride is the phase change material, a leak could deposit the highly hygroscopic solution onto or into the structure of the building, and will then absorb large amounts of atmospheric moisture creating damp and corrosion in the structures. In the event of a break or damage to an insulating material incorporating the solid or semi-solid phase change composition, leakage and contamination of the surrounding building structure is prevented or minimized. By confining the thermal stabilization composition in numerous cells of the blanket, leakage of significant damaging volumes is also reduced.

One aspect of the present disclosure, therefore, provides thermal stabilizing compositions, wherein the compositions comprise a phase change material admixed with a support material, and a nucleator. In the embodiments of the disclosure, the support material and the nucleator may be the same material or different materials. In the embodiments of this aspect of the disclosure, the phase change material may be selected from the group consisting essentially of: calcium chloride hexahydrate, sodium sulfate, paraffin, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chloride hexahydrate, potassium chloride and calcium chloride, or a mixture thereof.

In one embodiment of the disclosure, the phase change material may comprise a mixture of strontium chloride hexahydrate, potassium chloride and calcium chloride.

In another embodiment, the phase change material may comprise a supersaturated solution of calcium chloride hexahydrate.

In the embodiments of this aspect of the disclosure, the support material may comprise an adsorbent material. In these embodiments of this aspect of the disclosure, the support material may be selected from the group consisting of a diatomaceous earth, fly ash, perlite, cellulose pellets, cellulose granules, cellulose powder, cellulose fiber, a plastic, a ceramic and a mineral. In one embodiment, the support material may comprise a diatomaceous earth.

In one embodiment of this aspect of the disclosure, the support material may further comprise a nucleator. In an embodiment of the disclosure, the nucleator may comprise calcium chloride dihydrate admixed with an inert support material.

In one embodiment of this aspect of the disclosure, the thermal stabilizing composition may comprise a supersaturated solution of calcium chloride hexahydrate admixed with a support material, wherein the support material comprises a diatomaceous earth intimately admixed with calcium chloride dihydrate.

In one embodiment of a thermal stabilizing composition according to the disclosure, the composition may comprise a first mixture, wherein the first mixture is a phase change material comprising about 200 parts by weight water, about 10 parts by weight strontium chloride hexahydrate, 10 parts by weight potassium chloride and 200 parts by weight anhydrous calcium chloride, and a second mixture, wherein the second mixture comprises the diatomaceous earth support material admixed with calcium chloride dihydrate in the weight ratio of about 3:1, and wherein the first and second mixtures are joined in a mixture of about 1 part by weight of the first mixture to about 2 parts by weight of the second mixture.

Another aspect of the present disclosure encompasses a heat insulation blanket for reducing heat transfer between adjacent spaces, comprising at least two plies of thermoplastic sheet material in superposed relationship and having opposing inner surfaces, and a seal, wherein the seal connects the plies of sheet material, and wherein the seal and the opposing inner surfaces of the superposed plies define a cell, the cell containing a volume of a phase change material admixed with a support material and a nucleator.

In one embodiment of the heat insulation blanket, the support material and the nucleator may be the same material.

In embodiments of this aspect of the disclosure, the heat insulation blanket may further comprise a plurality of seals, wherein the plurality of seals and the opposing inner surfaces of the superposed plies form a plurality of cells, the plurality of cells containing a volume of a phase change material admixed with a support material.

In one embodiment of the disclosure, the plurality of seals may comprise longitudinal seals and lateral seals thereby defining a lattice connecting the superposed plies.

In the embodiments of the disclosure, the seals may be selected from the group consisting of a thermal seal, an adhesive seal, and a combination thereof.

In the embodiments of this aspect of the disclosure, the phase change material may be selected from the group consisting essentially of: calcium chloride hexahydrate, sodium sulfate, paraffin, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chlorides hexahydrate, potassium chloride and calcium chloride, or a mixture thereof.

In one embodiment of the disclosure, the phase change material may be a mixture of strontium chlorides hexahydrate, potassium chloride and calcium chloride.

In another embodiment of the heat insulation blanket according to the present disclosure, the phase change material comprises a supersaturated solution of calcium chloride.

In the embodiments of this aspect of the disclosure, the support material may comprise an adsorbent material. In these embodiments of this aspect of the disclosure, the support material may be selected from the group consisting of a diatomaceous earth, cellulose pellets, cellulose granules, cellulose powder, cellulose fiber, a plastic, a ceramic and a mineral. In one embodiment, the support material comprises a diatomaceous earth.

In these embodiments of the disclosure, the support material may further comprise a nucleator admixed therein.

In one embodiment of the disclosure, the nucleator comprises calcium chloride dihydrate admixed therein.

In another embodiment of the disclosure, the phase change material may comprise a supersaturated solution of calcium chloride hexahydrate admixed with a support material, and wherein the support material may comprise a diatomaceous earth admixed with calcium chloride dihydrate.

In embodiments of the disclosure, the phase change material may comprise a mixture of strontium chloride hexahydrate, potassium chloride and calcium chloride admixed with a support material, and wherein the support material may comprise a diatomaceous earth admixed with calcium chloride dihydrate.

In yet another embodiment of this aspect of the disclosure, the phase change material comprises a first mixture comprising about 200 parts by weight water, about 10 parts by weight strontium chloride hexahydrate, 10 parts by weight potassium chloride and 200 parts by weight anhydrous calcium chloride, a second mixture comprising a diatomaceous earth support material admixed with calcium chloride dihydrate in the weight ratio of about 3:1, and wherein the first and second mixtures are joined in a mixture of about 1 part by weight of the first mixture to about 2 parts by weight of the second mixture.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Now having described the embodiments of the disclosure, in general, the example describes some additional embodiments. While embodiments of present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

I claim:

1. A heat insulation blanket for reducing heat transfer between adjacent spaces, comprising: at least two plies of thermoplastic sheet material in superposed relationship and having opposing inner surfaces, and a seal, wherein the seal connects the plies of sheet material, and wherein the seal and the opposing inner surfaces of the superposed plies define a cell, the cell containing a volume of a thermal stabilizing composition comprising a phase change material admixed with a support material and a nucleator, wherein the phase change material comprises a supersaturated solution of calcium chloride hexahydrate, the support material comprises a diatomaceous earth, and the nucleator is calcium chloride dihydrate.

2. A heat insulation blanket for reducing heat transfer between adjacent spaces, comprising: at least two plies of thermoplastic sheet material in superposed relationship and having opposing inner surfaces, and a seal, wherein the seal connects the plies of sheet material, and wherein the seal and the opposing inner surfaces of the superposed plies define a cell, the cell containing a volume of a thermal stabilizing composition comprising a phase change material admixed with a support material and a nucleator, wherein the phase change material comprises a mixture of strontium chloride hexahydrate, potassium chloride, and calcium chloride admixed with a support material, the support material comprises a diatomaceous earth, and the nucleator is calcium chloride dihydrate.

3. A heat insulation blanket for reducing heat transfer between adjacent spaces, comprising: at least two plies of thermoplastic sheet material in superposed relationship and having opposing inner surfaces, and a seal, wherein the seal connects the plies of sheet material, and wherein the seal and the opposing inner surfaces of the superposed plies define a cell, the cell containing a volume of a thermal stabilizing composition comprising a phase change material admixed with a support material and a nucleator, wherein the thermal stabilizing composition comprises:
  a first mixture comprising about 200 parts by weight water, about 10 parts by weight strontium chloride hexahydrate, 10 parts by weight potassium chloride and 200 parts by weight anhydrous calcium chloride,
  a second mixture comprising a diatomaceous earth support material admixed with the nucleator in the weight ratio of about 3:1, wherein the nucleator is calcium chloride dihydrate, and wherein the first and second mixtures are joined in a mixture of about 1 part by weight of the first mixture to about 2 parts by weight of the second mixture.

4. The heat insulation blanket of claim 3, further comprising a plurality of seals, wherein the plurality of seals and the opposing inner surfaces of the superposed plies form a plurality of cells, and wherein each cell of the plurality of cells contains a volume of the thermal stabilizing composition.

5. The heat insulation blanket of claim 3, wherein the plurality of seals comprises longitudinal seals and lateral seals thereby defining a lattice connecting the superposed plies.

* * * * *